March 31, 1970  W. B. CRANE  3,503,176

GARMENT BOXING METHOD AND APPARATUS

Filed Dec. 21, 1967  8 Sheets-Sheet 1

INVENTOR.
WALTON B. CRANE
BY Forrest J. Lilly
ATTORNEY

INVENTOR.
WALTON B. CRANE
BY Forrest J. Lilly
ATTORNEY

United States Patent Office 3,503,176
Patented Mar. 31, 1970

3,503,176
GARMENT BOXING METHOD AND APPARATUS
Walton B. Crane, Sherman Oaks, Calif., assignor to Allied Plastic Company, Los Angeles, Calif., a corporation of California
Filed Dec. 21, 1967, Ser. No. 692,390
Int. Cl. B65b 5/06, 25/20, 35/10
U.S. Cl. 53—29                                    35 Claims

ABSTRACT OF THE DISCLOSURE

Apparatus is provided for receiving a hanger bar loaded with a plurality of garments suspended on hangers from the hanger bar, the hanger bar being automatically positioned at a predetermined location. A cardboard carton is opened into a tubular shape and placed on a frame above the loaded hanger bar and then moved into registration therewith so that the open-ended carton can be drawn downwardly over the hanger bar. The hanger bar is then released from its support so that it can be seated upon the sides of the carton. The ends of the carton are then closed, producing a container assembly with hanger-supported clothing inside the carton which serves as a shipping container. The apparatus provided reduces to a minimum manual operations involved in the loading of garments into the carton.

BACKGROUND OF THE INVENTION

The present invention relates generally to the art of packaging garments for shipping, and more particularly is concerned with a method and apparatus for quickly, easily, and economically loading a plurality of hanger-supported garments into a shipping carton in such a manner that the garments are supported on the hangers within the carton during shipment.

It has been a common practice in the garment industry for a long time to ship garments by folding them and placing the folded garments in disposable cardboard boxes. This procedure has been found to have numerous disadvantages, the most obvious being that the garments arrive in a mussed and wrinkled condition and must be freshened and pressed before they can be displayed for sale. These same garments in the course of manufacture were pressed after they were finished and placed on the garment hangers. If they can be preserved in this condition, they will arrive at the point of sale in an unwrinkled state such that no further pressing or freshening operations are required. It will be realized that an important economy in time and costs can thereby be effected.

At times, certain types of garments are shipped within very limited areas on their hangers supported on open racks which are mobile. While this method is limited to short range movements of the garments, the method is still inherently costly from the standpoint that maximum use cannot be made of the available space and also from the standpoint that manual loading and unloading of garments are unduly time consuming. Other disadvantages are that the garments are exposed to dirt and weather and are also subject to losses from pilfering.

The disadvantages of both the above procedures have been largely eliminated by assembling a plurality of garments on hangers on a hanger bar and loading the entire assembly into a fiberboard container or carton which can then be closed around the garments. The carton is sufficiently rigid to serve as a shipping container for either short or long distance movements. It protects the garments in all aspects from soil, wrinkling, and other damage so that they arrive at their destination in a fresh, crisp condition. A container assembly of this character is disclosed in my co-pending application Ser. No. 608,897, filed Jan. 12, 1967, for "Container for Hanger-Supported Clothing," to which reference may be made for further detail.

Because of the large size of the cartons required to take garments without folding, particularly in the case of coats and dresses, and because of the size, weight and cumbersome handling characteristics of a hanger bar loaded with a plurality of garments, manual loading of the cartons has been found to be slow and inefficient.

Consequently, it becomes a general object of the present invention to provide a mechanical means for loading a group of hanger supported garments, together with the hanger bar from which said garments are supported, into a carton which can be used as a shipping carton, in such a manner that the garments are not folded or wrinkled.

It is a further object of the present invention to provide an apparatus for receiving and holding an open carton in a manner to facilitate loading of the carton to form a complete assembly of the container and the garments therein, in a simple and efficient manner.

SUMMARY OF THE INVENTION

The above and other objects of the present invention have been attained by loading a group of garments hanging from a rigid hanger bar into a carton by performing a series of steps, including conveying the hanger bar and the garments supported thereon to a transfer station, forming a carton adapted to receive the hanger bar and garments into a tubular shape with the ends of the carton open and its axis oriented generally vertically, positioning the carton at a loading station, and picking up the hanger bar at the transfer station and moving it to the loading station where it is positioned beneath and in alignment with the open end of the carton. The carton is then moved downwardly around the hanger bar and garments and the hanger bar is transferred to and seated upon the upper end of the sidewalls of the carton, which is then finally closed and sealed with the garments inside to form a shipping container.

In a preferred embodiment of apparatus for carrying out this method, there is provided carton holding means supporting a carton having foldable end flaps open at opposite ends of the carton; support means adapted to engage and support a loaded hanger bar beneath the carton in registration therewith to permit the carton to be drawn downwardly around the hanger bar and the garments thereon; means receiving the carton as it moves downwardly and limiting the extent of the downward travel in order to locate the top of the carton at a predetermined position with respect to the hanger bar; means for releasing the loaded hanger bar from the support in order that the hanger bar can be seated on and supported by the sidewalls of the carton. Trolley means are preferably provided for conveying loaded hanger bars to the position beneath the open carton along with means for stopping each loaded hanger bar on the trolley means at a predetermined position to insure registration with the carton.

The carton holding means comprises an open frame of rectangular shape over which the carton is manually placed by sliding the carton upwardly over the frame. The frame is adjustable in size to hold cartons of different widths. Support means for supporting a loaded hanger bar is preferably mounted on the carton holding means and is adapted to pick up the loaded hanger bar by a vertical reciprocating movement which brings the support means into engagement with the hanger bar and then lifts it off the trolley.

As the carton is moved down and off the carton holding means, it is moved into a receiving means which externally engages and supports a carton and preferably starts folding the various flaps at the bottom end of the carton in order to close the carton. Both the carton receiving means and the carton holding means are preferably adjustable in size to some extent in order to adapt these members to cartons of different sizes.

DESCRIPTION OF THE DRAWINGS

How the above objects and advantages of the present invention, as well as others not specifically mentioned, are achieved, will be more readily understood by reference to the following description and to the annexed drawing, in which.

DESCRIPTION OF A PREFERRED EMBODIMENT

General organization

Figure 1:
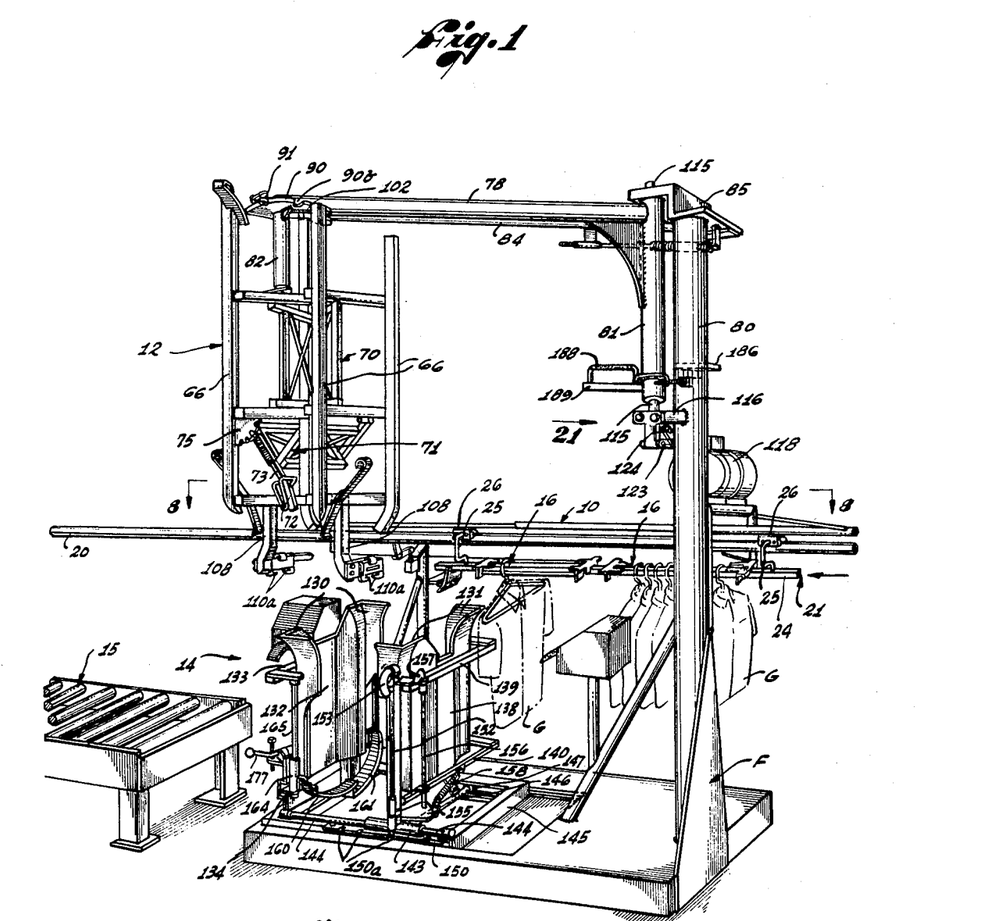
FIG. 1 is a front and side perspective of a garment boxing mechanism constructed according to the present invention.
Figures 2, 2A:
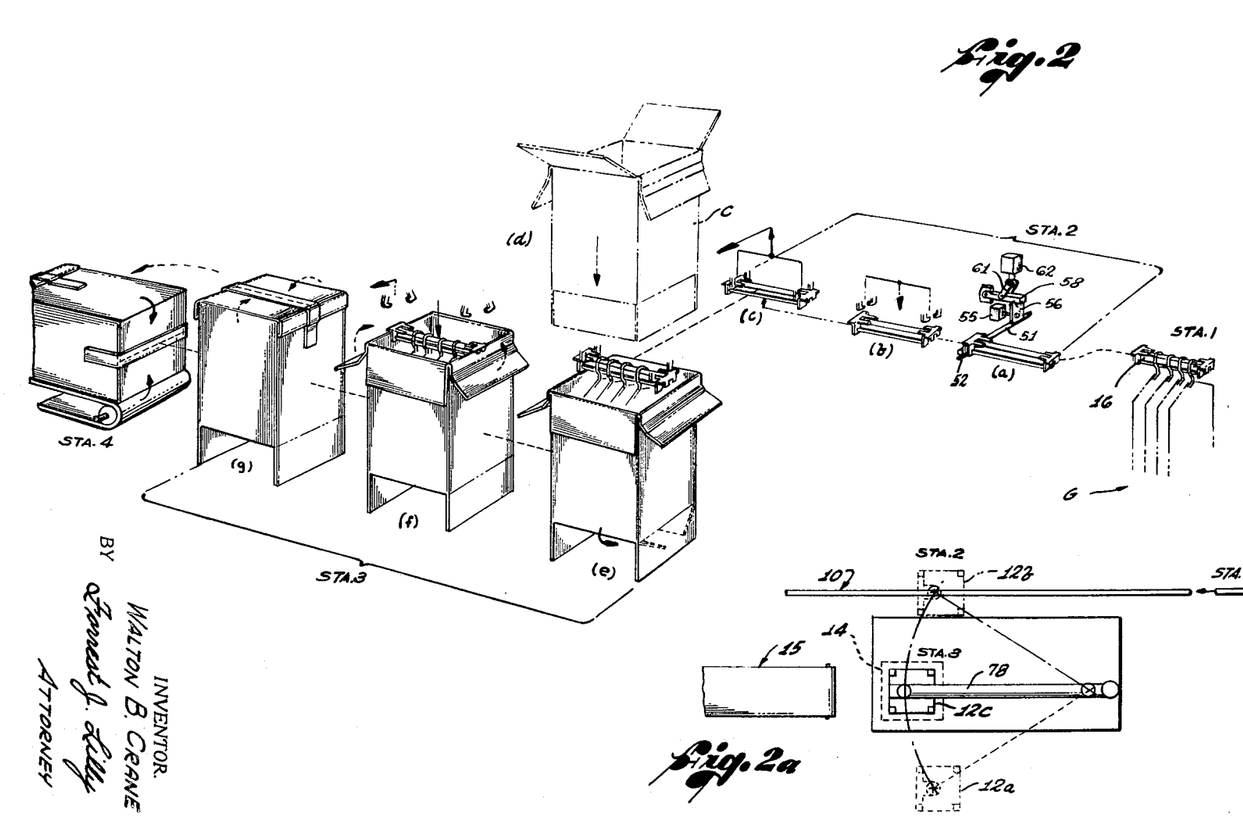
FIG. 2 is a flow diagram illustrating the sequence of operations at the several stations of the garment boxing apparatus.
FIG. 2a is a diagrammatic plan view showing horizontal movement between various operating stations.

Referring now to FIGS. 1 and 2, it will be seen that boxing apparatus comprises generally a trolley means 10 for delivering garments to the boxing apparatus, means generally indicated at 12 for holding an open box or carton C for insertion of the garments therein, a receiver 14 for receiving and holding the carton and the garments therein during the final stages of loading the garments into the carton and initial stages of closing the carton, and finally a discharge conveyor 15 for removing the filled and closed carton from the boxing apparatus.

Trolley means 10 serves as a convenient means for bringing a hanger bar 16 to a predetermined position with respect to the boxing apparatus. The present apparatus is designed particularly with the requirement in mind that the trolley apparatus may be used as a convenient means for loading on a single hanger bar a shipment of garments which is made up of garments individually selected from storage racks at different positions in a warehouse and consequently the trolley means may include a large extent of track, not shown in the drawings. However, in the broad aspect of the invention, the remote track is not an essential feature since the garments may be gathered by other means and transported on carts or mobile racks to the boxing apparatus; and they may even be transported by hand from the racks to a stationary support at such predetermined position with respect to the boxing apparatus. This simplification may be used in a small installation.

Consequently, the loading of a hanger bar with garments G may take place at any suitable location; and station #1 may be regarded as any loading area, for example a warehouse or a group of storage racks.

This predetermined position to which the loaded hanger bar is delivered is indicated at station #2 in FIG. 2 and is the position in which a loaded hanger bar with its garments can be picked up and supported in a manner to enable an open carton C to be loaded by being drawn downwardly around the hanger bar and the garments thereon. Just before this, the open carton C is placed on carton-holding means 12, which has been adjusted to the proper width for the particular carton, by pulling the carton upwardly around the holding means so that the carton is supported thereon with the bottom open. The carton is then moved horizontally to bring it into registration with the loaded hanger bar at station #2 and the loaded hanger bar is then picked up and supported by the carton-holding means 12. This places the garments in registration with the carton so that the carton can now be pulled down around the garments.

This last motion is accomplished after moving the carton-holding means horizontally to station #3 at which the carton and the garments are over carton receiver 14. Thus, pulling the carton downwardly around the garments slides the carton into receiver 14, which likewise has been adjusted to the width of the particular carton. At the receiver, the hanger bar is released from the carton holder to engage and be supported by the sidewalls of carton C. The carton can now be closed, and it is removed from the carton receiver by tilting the receiver, the walls of the receiver moving outwardly to allow the carton to be pushed out of the tilted receiver onto conveyor 15. Conveyor 15 may be of any suitable type along which the carton is propelled manually, by gravity, or by positive means. In a broad sense, conveyor 15 is not an essential part of the invention; but the invention includes features of construction of the carton holding means which are included for the purpose of making transfer of the filled carton to the conveyor more easily accomplished.

TROLLEY MEANS

Having considered briefly the general organization and operation of the boxing apparatus, its component parts will now be described in greater detail. Trolley means 10 generally comprises rail 20 which is supported in any suitable manner, not shown in the drawing, as by posts, brackets, and other conventional hardware. Rail 20 is a means for supporting and transporting from any location to the boxing apparatus a plurality of trolley carriages 21, one of which is shown in FIG. 1. Rail 20 is preferably circular in cross section and provides a track along which wheels 22 of carriage 21 may roll freely.

Rail 20 as associated with the boxing apparatus may be a portion of an extensive trolley system, not illustrated, which extends into storage areas or manufacturing areas. In these areas, the rail may be inclined to enable carriage 21 to move under the influence of gravity, or the carriage may be moved manually along the rail to bring the loaded hanger bar on the carriage into the boxing apparatus illustrated and its zone of activity, and more particularly within the range of action of the carriage driving means, later described.

Figure 3:
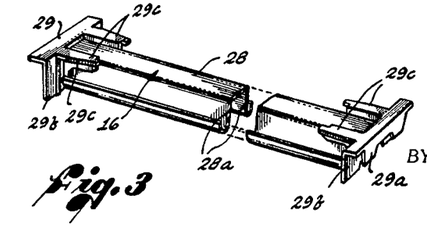
FIG. 3 is a perspective of a garment hanger bar alone.

Each carriage 21 comprises a horizontally extending bar 24, which is preferably rectangular in cross section (FIG. 11) and is supported near its ends by two hanger rods 25 (FIG. 9) which at their upper ends are connected to a bracket 26 on which a pair of wheels 22 is rotatably mounted. In cross section, carriage 24 conforms to and is slightly smaller than the interior of the channel-shaped hanger bar 16. The hanger bar 16 is described in greater detail in my co-pending patent application identified above; but from reference to FIG. 3, it will be seen that the hanger bar comprises a central elongated hanger-receiving section 28, which, viewed in cross section, resembles an open channel with dependent legs 28a. At each end of the central section is a bar support 29 which is adapted to engage the sidewalls of a carton or box C in a manner which will be described. For this purpose, the support 29 at each end has a pair of horizontally spaced depending flanges 29a and 29b, shown particularly in FIGS. 3 and 11a. For reasons which will become apparent, inner flange 29b is longer and extends below outer flange 29a.

Figures 9, 11, 11A:
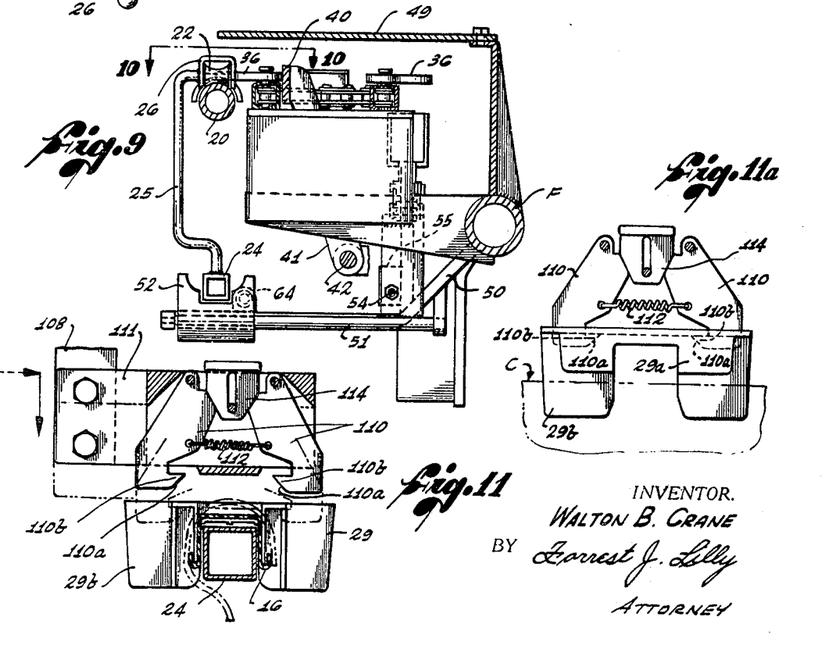
FIG. 9 is a vertical section through the driving means taken on line 9—9 of FIG. 8.
FIG. 11 is an enlarged side elevation of the hanger bar lifting tongs illustrating alternate positions thereof.
FIG. 11a is a view similar to FIG. 11 illustrating the position of the tongs relative to a carton at the time of releasing a hanger bar.

Each end support for the hanger bar is also provided with a pair of outwardly and oppositely extending side flanges 29c. As shown in FIG. 11, these flanges are designed to be engaged by tongs, described later, to lift the loaded hanger bar free of the trolley carriage.

Figure 4:
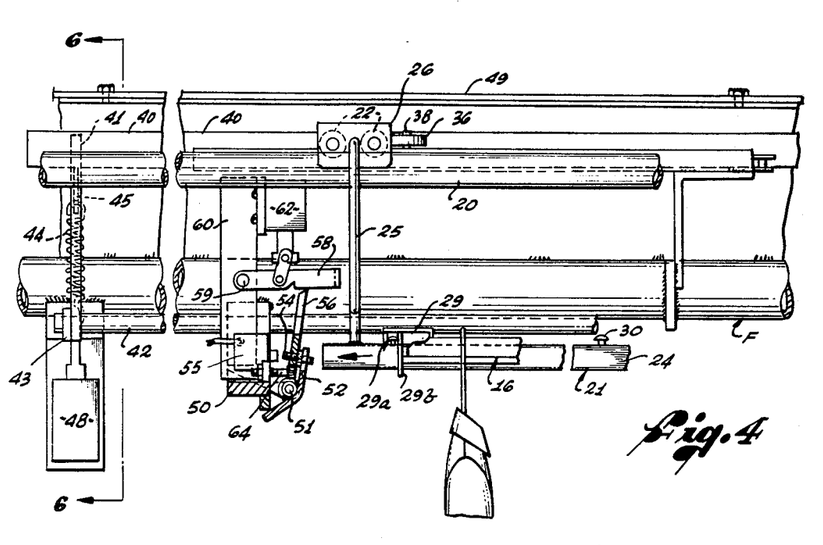
FIG. 4 is a combined fragmentary elevation and vertical section of a portion of the apparatus showing the trolley means and means for stopping the carriage at a predetermined position.

As may be seen in FIG. 4, carriage 24 has one or more upwardly extending pins 30. When the hanger bar 16 is placed on the carriage, a pin 30 is located between the two flanges 29a and 29b, thereby locating the hanger bar with respect to the carriage and also preventing the hanger bar from shifting longitudinally of the carriage. The number of pins 30 and their spacing depend upon various factors including the length of the carriage, and the number and lengths of the hanger bars which it is adapted to carry. Hanger bars may come in different lengths, preferably differing by a fixed increment or multiple thereof; and the pins are preferably spaced to accommodate any combination of such hanger bars to obtain maximum utility from the apparatus.

Although the carriage 21 may be propelled manually along rail 20 or it may move under the influence of gravity, it is preferred that, once the carriage reaches the close vicinity of the boxing apparatus, it move in a positive and controlled manner. For this purpose, it is preferable to provide the trolley means with a suitable gate mechanism, not shown, which can be operated at will to introduce the carriages individually into the range of action of the carriage driving means which is illustrated particularly in FIGS. 8, 9, and 10. This driving means comprises a pair of horizontally spaced sprockets 32 around which passes roller chain 33 which is driven by the sprockets. Any suitable power source may be provided to drive the sprockets and chain, such as gear head motor 34 of which the output shaft is drivingly connected through a suitable gear reduction system to shaft 32a on which a sprocket 32 is mounted.

Although the invention is not necessarily limited to a roller chain, this type of endless member has the advantage that it is a simple matter to install on it at convenient intervals a plurality of pivotally mounted driving dogs 36. One of these driving dogs is shown in greater detail in FIG. 10 wherein it will be seen that the dog 36 is pivotally mounted on the chain at 37 to swing between the driving position shown in full lines and the non-driving or inactive position shown in broken lines. In order to limit the movement of the dog so that it will not over-travel these two positions, it is preferably provided with an arcuate slot which engages a second pin 38 in the roller chain which allows the dog to swing freely within the desired range of positions.

Figure 8:
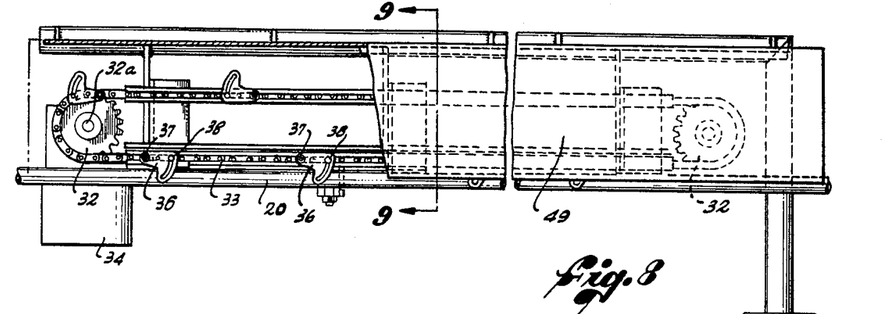
FIG. 8 is a plan view as on line 8—8 of FIG. 1 illustrating the driving means for positively advancing the trolley carriage, the guard being broken away for better illustration.
Figure 10:
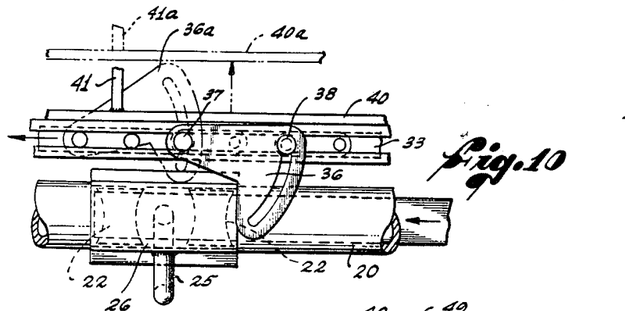
FIG. 10 is a fragmentary view similar to a portion of FIG. 8, but enlarged, showing alternate positions of the carriage driving dogs.

It will be seen from FIG. 8 that one run of chain 33 between the two sprockets 32 extends parallel to trolley rail 20 and in close proximity thereto. Accordingly, when dogs 36 are on this run of the chain, they can be held in the driving position, that is the solid line position of FIG. 10, in which they overhang track 20 and engage a bracket 26 at the upper end of a carriage support rod 25, as shown in FIG. 10. Thus, the continuously moving chain advances the carriage along the rail.

Figure 6:
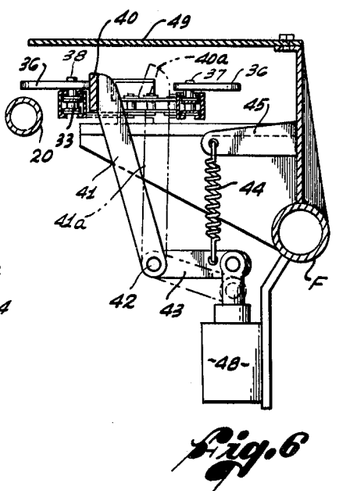
FIG. 6 is a fragmentary vertical section on line 6—6 of FIG. 4.

Along the run of the chain nearer rail 20, the dogs are biased into the driving position; but it is desired that they can be inactivated at times in order that the carriage can be advanced by the dogs to a predetermined location and then stopped, although drive chain 20 continues to move. The means for so biasing the dogs into the driving position is shown in FIG. 6 and comprises guide rail such as bar 40 which extends alongside and parallel to one run of chain 33 in a position to engage one side of the pivoted dogs and hold them in the driving position. Guide rail 40 is mounted upon arms 41 pivoted to the apparatus frame F by rock shaft 42. Shaft 42 is rocked by lever 43 attached to the shaft and normally urged upward to rotate the shaft and arms 41 in a counterclockwise direction, by spring 44 attached at its upper end to bracket 45 on the frame F. Rock shaft 42 and arms 41 can be swung clockwise against the pull of spring 44 by solenoid 48, thereby moving bar 40 to the broken line position 40a of FIGS. 6 and 10. This movement removes biasing bar 40 from its position close to the chain and retracts it sufficiently that the dogs are free to rotate about their individual pivots 37. This rotation of a driving dog advancing a carriage allows it to disengage from the carriage bracket, as shown in FIG. 10, thereby stopping the carriage but allowing chain 33 to continue moving. Returning guide rail 40 to its advanced or operative position causes the next approaching dog to engage guide rail 40 and be turned about pivot 37 to overhang trolley rail 20 where it again engages and advances the carriage, as will be further described. The moving drive chain and dogs are covered by guard 49 above the chain.

Guide rail 40 is retracted to the inactive position 40a by energizing solenoid 48, spring 44 serving to return the guide rail to the advanced position when the solenoid is de-energized. The means for energizing the solenoid at the proper time to stop the carriage at a predetermined position is shown particularly in FIGS. 4, 5, and 9.

This position control mechanism is supported on the machine frame by stationary arm 50 upon which is pivotally mounted rod 51 in a pair of suitably spaced bearings on the stationary arm. Rod 51 establishes a horizontal axis about which abutment and indexing plate 52 can turn, the abutment plate being rigidly attached, or otherwise mounted upon, rod 51. As shown particularly in FIG. 9, the upper edge of abutment plate 52 is notched to receive with limited clearance carriage 24 in such a manner that the upper portion of abutment plate 52 is disposed in the path of a hanger bar 16 on carriage 21. The notch also permits end flange 29a on the hanger bar to pass plate 52.

Abutment plate 52 is gravity-biased towards a normal forward position illustrated in FIG. 4. As the advancing trolley carriage moves to the left in FIG. 4, the end flange 29a on the hanger bar passes over the plate and the inner flange 29b engages the upper portion of abutment plate 52 and causes the plate to swing about pivot 51 to the upright position of FIG. 5 where the plate is between flanges 29a and 29b. Extending upwards from and rigidly connected to rod 51 is arm 56 that carries an adjustable switch operating screw 54 which is engageable with the actuating arm of microswitch 55 when the abutment plate reaches the upright position in response to movement produced by engagement with a hanger bar on the carriage. Microswitch 55 is normally open and is closed by the movement of screw 54. Being in series with solenoid 48, when switch 55 is closed, solenoid 48 is energized, thereby inactivating in the manner already described all dogs capable of driving carriage 21. This halts the carriage at the predetermined position, as in FIG. 5.

In order that the hanger bars do not shift with respect to the carriage when they engage abutment plate 52, or when the carriage is travelling, the hanger bars are placed on the carriage in such a manner that the end flanges 29a and 29b straddle a pin 30.

Plate 52 by entering between hanger bar flanges 29a and 29b establishes the position of the leading end of the hanger bar in the predetermined rest position desired for further operations.

Figure 5:
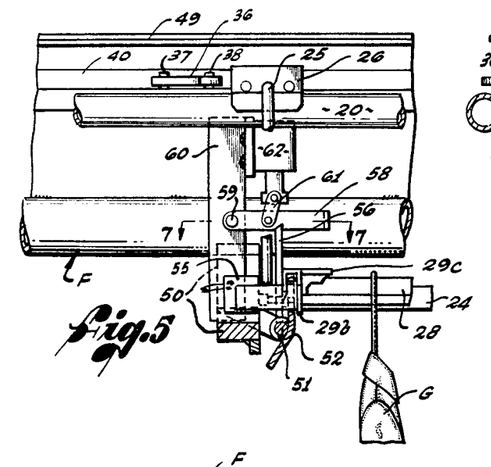
FIG. 5 is a fragmentary view similar to a part of FIG. 4 showing an alternate position of the abutment member stopping the trolley carriage.
Figure 7:
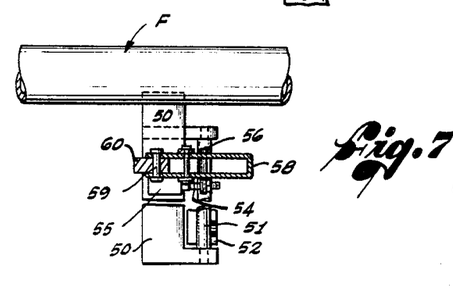
FIG 7 is a fragmentary horizontal section on line 7—7 of FIG. 5.

It is desirable to retain abutment and indexing plate 52 in the raised position of FIG. 5 through a certain cycle of operations; and for this purpose, a solenoid controlled latch mechanism illustrated in FIGS. 5 and 7, is provided. This latch mechanism comprises an upward extension of latch arm 56, which is rigidly attached to pivot 51. The extension is engageable at its upper end with a gravity-biased keeper 58. Keeper 58 is pivotally mounted at 59 on post 60 which is rigidly connected at its lower end to arm 50. Keeper 58 is connected by a link 61 to the plunger of solenoid 62 which, when energized, lifts keeper 58 free of engagement with latch arm 56. When arm 56 is moved as a consequence of engagement of the hanger bar on the trolley with abutment plate 52, the upper end of the latch arm is rocked into position where it can enter a notch in the lower side of keeper 58; and in order to prevent the abutment plate from over-travelling this position, arm 50 is preferably provided with adjustable stop 64 that limits movement of the abutment plate.

Solenoid 62 is controlled either by a mechanically actuated switch located at a suitable position or by a manually operated switch, or by both; and when energized, solenoid 62 raises keeper 58 and allows arm 56 and abutment plate 52 to swing by gravity to the forward position.

CARTON-HOLDING MEANS

Figures 12, 13, 14:
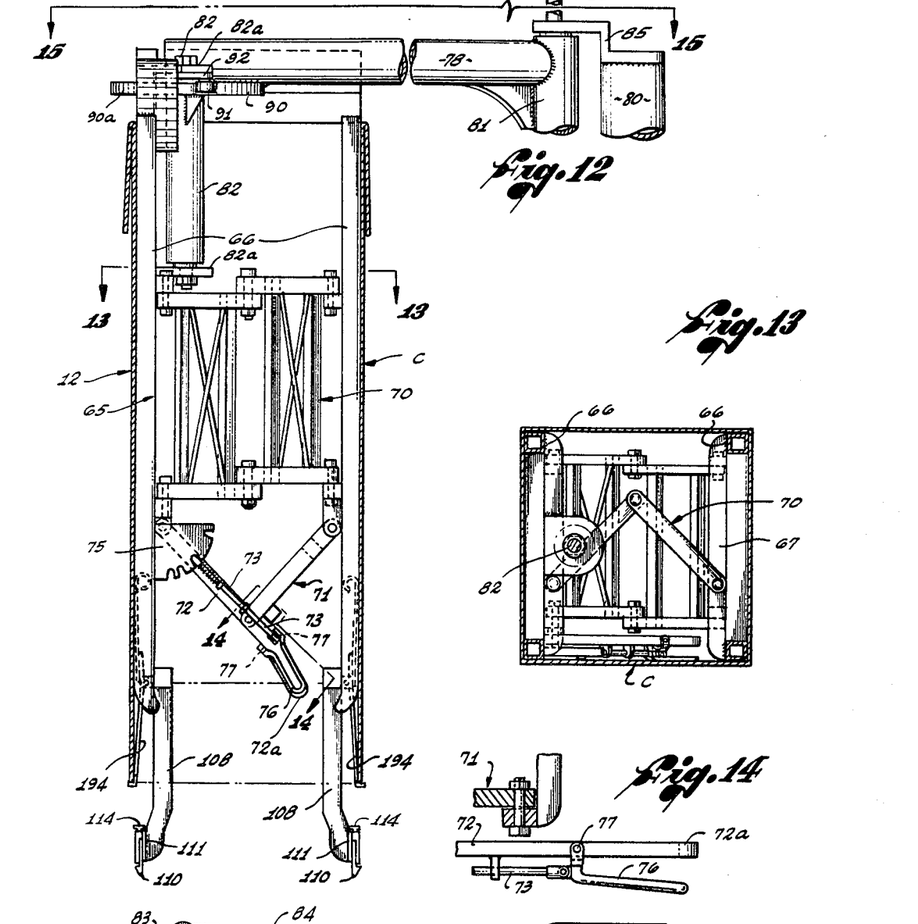
FIG. 12 is a side elevation of the carton-holding means and a portion of the support therefor.
FIG. 13 is a horizontal section on line 13—13 of FIG. 12.
FIG. 14 is a fragmentary section and elevation on line 14—14 of FIG. 12.

Carton-holding means to hold an open carton C are indicated generally at 12. Such means include an open rectangular framework 65 comprising four corner posts 66 around which a carton C having both ends open, can be slip upwardly manually to the position indicated in FIG. 12. The four corner posts are interconnected in such a manner that the size of the support means can be adjusted in at least one horizontal dimension in order to adapt it to cartons of different sizes. Since in this industry, cartons are usually standard in one dimension but variable in the dimension at right angles thereto as required to fit hanger bars of different lengths, it is satisfactory that the support means be adjustable in size in one direction only. For this purpose, corners posts 66 are mounted in two relatively movable pairs. The two posts of each pair, including a front post and a rear post as viewed in FIG. 13, are rigidly interconnected by horizontal braces as at 67. The righthand pair and the lefthand pair of posts are interconnected by two sets of lazy-tongs type connecting means, indicated generally at 70 and 71 and having respectively vertical and horizontal pivots, permitting the right and lefthand pairs of posts to be moved horizontally toward and away from each other, while at the same time maintaining all the posts parallel to each other and vertical.

Adjustment of the horizontal spacing between the two sides of the frame is provided in order to accommodate cartons of different widths, and is secured by a lever 72. Lever 72 is pivotally connected at its outer end to the lefthand pair of posts, and terminates at its free end in handle 72a. Thus, when the handle 72a is moved upwardly in FIG. 12, the righthand pair of posts is moved away from the lefthand or fixed pair and the size of the carton-supporting means in one direction (plane of the drawing) is increased. Moving the handle downwardly draws the pairs of posts together, and accommodates a carton smaller in that horizontal dimension. The handle can be maintained in one of several selected adjusted positions corresponding to carton widths by a latch mechanism comprising a plunger 73 slidably mounted on lever 72 and spring-urged at one end into one of several slots along the arcuate edge of fixed plate 75. As may be best seen in FIG. 14, plunger 73 is connected to an operating lever 76 pivotally mounted at 77 to handle 72a which enables the operator upon grasping the handle and lever 76 to release the latch by retracting the plunger from the slot in plate 75.

The carton-holding frame 65 is supported at its upper end from swinging arm 78. Arm 78 in turn is pivotally mounted on stationary post 80 by hinge 81 and a suitable bearing means enabling the arm to swing about a vertical axis established by hinge 81. Post 80 is the stationary upright member of the frame structure F which also supports other elements of the boxing apparatus.

The carton-holding means 12 is thus mounted to swing through a horizontal arc between a starting forward position (12a, FIG. 2a) at which the carton C is placed on the holding means and a rear position at station #2 (12b, FIG. 2a) where the hanger bar is picked up and supported in position directly below a carton. However, as the carton-supporting means moves through this horizontal arc, it is desired that the frame supporting the carton be maintained constantly in a given orientation with respect to the rest of the apparatus, as for example the axis of the trolley, and that the frame not be permitted to rotate about a vertical axis as arm 78 turns about axis 81. For this purpose, there is provided a parallelogram mechanism illustrated particularly in FIG. 15 adapted to maintain a given orientation of the carton-holding frame 65 as illustrated more particularly in FIGS. 16, 17 and 18.

Frame 65 is pivotally mounted on the outer end of arm 78 by shaft 82 which enables the carton-holding frame to turn about a vertical axis with respect to arm 78. Shaft 82 is attached to the lefthand pair of parts 66 by a pair of brackets 82a, thereby keeping one side of the carton-holding frame fixed and causing all width-adjusting movement of lever 72 to occur as movement of the righthand pair of posts 66 takes place. At one upper corner, frame 65 is provided with a rigid arm 83 to which is pivotally connected one end of rod 84, the other end of rod 84 being pivotally connected to stationary bracket 85 mounted on top of post 80 and also providing part of the means for pivotally connecting arm 78 to the post. Rod 84 is parallel to arm 78 and the pivotal connections at the two ends of the rod are located on axes which are perpendicular to the axis of arm 78 and which respectively pass through the axes at 81 and 82.

Figure 15:
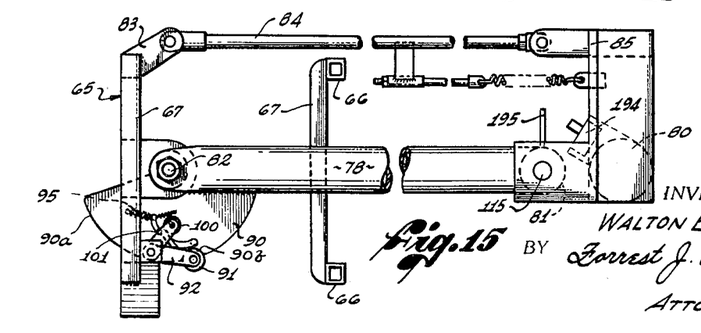
FIG. 15 is a partial plan of the support arm structure only taken on line 15—15 of FIG. 12.
Figure 16:
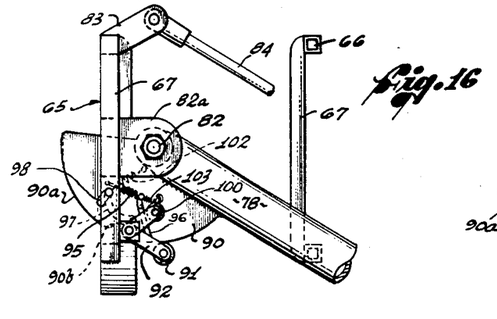
FIGS. 16, 17, and 18 are fragmentary plans similar to FIG. 15 illustrating different positions of the supporting arm and detent mechanism for the carton-holding means.

After arm 78 swings away from the operator, i.e., clockwise from the position of FIG. 15 or 12c in FIG.2a to the transfer position at which it picks up a loaded hanger bar, the parts are in the relative positions indicated in FIG. 16 or at 12b in FIG.2a. When the arm and the carton-holding means swing toward the operator from the position of FIG. 15, the parts move into the positions illustrated in FIG. 18 and at 12a in FIG. 2a.

In the intermediate or carton-loading position of FIG. 15 (12c in FIG. 2a), the carton support frame 65 is positioned over carton receiver 14; and it is desired to provide indexing means which automatically stop and yieldingly hold arm 78 in position with frame 65 directly over the will now be described in greater detail. Trolley means 10 generally comprises rail 20 which is supported in any suitable manner, not shown in the drawing, as by posts, brackets, and other conventional hardware. Rail 20 is a means for supporting and transporting from any location to the boxing apparatus a plurality of trolley carriages 21, one of which is shown in FIG. 1. Rail 20 is preferably circular in cross section and provides a track along which wheels 22 of carriage 21 may roll freely.

Rail 20 as associated with the boxing apparatus may be a portion of an extensive trolley system, not illustrated, which extends into storage areas or manufacturing areas. In these areas, the rail may be inclined to enable carriage 21 to move under the influence of gravity, or the carriage may be moved manually along the rail to bring the loaded hanger bar on the carriage into the boxing apparatus illustrated and its zone of activity, and more particularly within the range of action of the carriage driving means, later described.

Each carriage 21 comprises a horizontally extending bar 24, which is preferably rectangular in cross section (FIG. 11) and is supported near its ends by two hanger rods 25 (FIG. 9) which at their upper ends are connected to a bracket 26 on which a pair of wheels 22 is rotatably mounted. In cross section, carriage 24 conforms to and is slightly smaller than the interior of the channel-shaped hanger bar 16. The hanger bar 16 is described in greater detail in my co-pending patent application identified above; but from reference to FIG. 3, it will be seen that the hanger bar comprises a central elongated hanger-receiving section 28, which, viewed in cross section, resembles an open channel with dependent legs 28a. At each end of the central section is a bar support 29 which is adapted to engage the sidewalls of a carton or box C in a manner which will be described. For this purpose, the support 29 at each end has a pair of horizontally spaced depending flanges 29a and 29b, shown particularly in FIGS. 3 and 11a. For reasons which will become apparent, inner flange 29b is longer and extends below outer flange 29a.

Each end support for the hanger bar is also provided with a pair of outwardly and oppositely extending side flanges 29c. As shown in FIG. 11, these flanges are designed to be engaged by tongs, described later, to lift the loaded hanger bar free of the trolley carriage.

As may be seen in FIG. 4, carriage 24 has one or more upwardly extending pins 30. When the hanger bar 16 is placed on the carriage, a pin 30 is located between the two flanges 29a and 29b, thereby locating the hanger bar with respect to the carriage and also preventing the hanger bar from shifting longitudinally of the carriage. The number of pins 30 and their spacing depend upon various factors including the length of the carriage, and the number and lengths of the hanger bars which it is adapted to carry. Hanger bars may come in different lengths, preferably differing by a fixed increment or multiple thereof; and the pins are preferably spaced to accommodate any combination of such hanger bars to obtain maximum utility from the apparatus.

Although the carriage 21 may be propelled manually along rail 20 or it may move under the influence of gravity, it is preferred that, once the carriage reaches the close vicinity of the boxing apparatus, it move in a positive and controlled manner. For this purpose, it is preferable to provide the trolley means with a suitable gate mechanism, not shown, which can be operated at will to introduce the carriages individually into the range of action of the carriage driving means which is illustrated particularly in FIGS. 8, 9, and 10. This driving means comprises a pair of horizontally spaced sprockets 32 around which passes roller chain 33 which is driven by the sprockets. Any suitable power source may be provided to drive the sprockets and chain, such as gear head motor 34 of which the output shaft is drivingly connected through a suitable gear reduction system to shaft 32a on which a sprocket 32 is mounted.

Although the invention is not necessarily limited to a roller chain, this type of endless member has the advantage that it is a simple matter to install on it at convenient intervals a plurality of pivotally mounted driving dogs 36. One of these driving dogs is shown in greater detail in FIG. 10 wherein it will be seen that the dog 36 is pivotally mounted on the chain at 37 to swing between the driving position shown in full lines and the non-driving or inactive position shown in broken lines. In order to limit the movement of the dog so that it will not overtravel these two positions, it is preferably provided with an arcuate slot which engages a second pin 38 in the roller chain which allows the dog to swing freely within the desired range of positions.

It will be seen from FIG. 8 that one run of chain 33 between the two sprockets 32 extends parallel to trolley rail 20 and in close proximity thereto. Accordingly, when dogs 36 are on this run of the chain, they can be held in the driving position, that is the solid line position of FIG. 10, in which they overhang track 20 and engage a bracket 26 at the upper end of a carriage support rod 25, as shown in FIG. 10. Thus, the continuously moving chain advances the carriage along the rail.

Along the run of the chain nearer rail 20, the dogs are biased into the driving position; but it is desired that they can be inactivated at times in order that the carriage can be advanced by the dogs to a predetermined location and then stopped, although drive chain 20 continues to move. The means for so biasing the dogs into the driving position is shown in FIG. 6 and comprises guide rail such as bar 40 which extends alongside and parallel to one run of chain 33 in a position to engage one side of the pivoted dogs and hold them in the driving position. Guide rail 40 is mounted upon arms 41 pivoted to the apparatus frame F by rock shaft 42. Shaft 42 is rocked by lever 43 attached to the shaft and normally urged upward to rotate the shaft and arms 41 in a counterclockwise direction, by spring 44 attached at its upper end to bracket 45 on the frame F. Rock shaft 42 and arms 41 can be swung clockwise against the pull of spring 44 by solenoid 48, thereby moving bar 40 to the broken line position 40a of FIGS. 6 and 10. This movement removes biasing bar 40 from its position close to the chain and retracts it sufficiently that the dogs are free to rotate about their individual pivots 37. This rotation of a driving dog advancing a carriage allows it to disengage from the carriage bracket, as shown in FIG. 10, thereby stopping the carriage but allowing chain 33 to continue moving. Returning guide rail 40 to its advanced or operative position causes the next approaching dog to engage guide rail 40 and be turned about pivot 37 to overhang trolley rail 20 where it again engages and advances the carriage, as will be further described. The moving drive chain and dogs are covered by guard 49 above the chain.

Guide rail 40 is retracted to the inactive position 40a by energizing solenoid 48, spring 44 serving to return the guide rail to the advanced position when the solenoid is de-energized. The means for energizing the solenoid at the proper time to stop the carriage at a predetermined position is shown particularly in FIGS. 4, 5, and 9.

This position control mechanism is supported on the machine frame by stationary arm 50 upon which is pivotally mounted rod 51 in a pair of suitably spaced bearings on the stationary arm. Rod 51 establishes a horizontal axis about which abutment and indexing plate 52 can turn, the abutment plate being rigidly attached, or otherwise mounted upon, rod 51. As shown particularly in FIG. 9, the upper edge of abutment plate 52 is notched to receive with limited clearance carriage 24 in such a manner that the upper portion of abutment plate 52 is disposed in the path of a hanger bar 16 on carriage 21. The notch also permits end flange 29a on the hanger bar to pass plate 52.

Abutment plate 52 is gravity-biased towards a normal forward position illustrated in FIG. 4. As the advancing trolley carriage moves to the left in FIG. 4, the end flange 29a on the hanger bar passes over the plate and the inner flange 29b engages the upper portion of abutment plate 52 and causes the plate to swing about pivot 51 to the upright position of FIG. 5 where the plate is between flanges 29a and 29b. Extending upwards from and rigidly connected to rod 51 is arm 56 that carries an adjustable switch operating screw 54 which is engageable with the actuating arm of microswitch 55 when the abutment plate reaches the upright position in response to movement produced by engagement with a hanger bar on the carriage. Microswitch 55 is normally open and is closed by the movement of screw 54. Being in series with solenoid 48, when switch 55 is closed, solenoid 48 is energized, thereby inactivating in the manner already described all dogs capable of driving carriage 21. This halts the carriage at the predetermined position, as in FIG. 5.

In order that the hanger bars do not shift with respect to the carriage when they engage abutment plate 52, or when the carriage is travelling, the hanger bars are placed on the carriage in such a manner that the end flanges 29a and 29b straddle a pin 30.

Plate 52 by entering between hanger bar flanges 29a and 29b establishes the position of the leading end of the hanger bar in the predetermined rest position desired for further operations.

It is desirable to retain abutment and indexing plate 52 in the raised position of FIG. 5 through a certain cycle of operations; and for this purpose, a solenoid controlled latch mechanism illustrated in FIGS. 5 and 7, is provided. This latch mechanism comprises an upward extension of latch arm 56, which is rigidly attached to pivot 51. The extension is engageable at its upper end with a gravity-biased keeper 58. Keeper 58 is pivotally mounted at 59 on post 60 which is rigidly connected at its lower end to arm 50. Keeper 58 is connected by a link 61 to the plunger of solenoid 62 which, when energized, lifts keeper 58 free of engagement with latch arm 56. When arm 56 is moved as a consequence of engagement of the hanger bar on the trolley with abutment plate 52, the upper end of the latch arm is rocked into position where it can enter a notch in the lower side of keeper 58; and in order to prevent the abutment plate from over-travelling this position, arm 50 is preferably provided with adjustable stop 64 that limits movement of the abutment plate.

Solenoid 62 is controlled either by a mechanically actuated switch located at a suitable position or by a manually operated switch, or by both; and when energized, solenoid 62 raises keeper 58 and allows arm 56 and abutment plate 52 to swing by gravity to the forward position.

CARTON-HOLDING MEANS

Carton-holding means to hold an open carton C are indicated generally at 12. Such means include an open rectangular framework 65 comprising four corner posts 66 around which a carton C having both ends open, can be slip upwardly manually to the position indicated in FIG. 12. The four corner posts are interconnected in such a manner that the size of the support means can be adjusted in at least one horizontal dimension in order to adapt it to cartons of different sizes. Since in this industry, cartons are usually standard in one dimension but variable in the dimension at right angles thereto as required to fit hanger bars of different lengths, it is satisfactory that the support means be adjustable in size in one direction only. For this purpose, corners posts 66 are mounted in two relatively movable pairs. The two posts of each pair, including a front post and a rear post as viewed in FIG. 13, are rigidly interconnected by horizontal braces as at 67. The righthand pair and the lefthand pair of posts are interconnected by two sets of lazy-tongs type connecting means, indicated generally at 70 and 71 and having respectively vertical and horizontal pivots, permitting the right and lefthand pairs of posts to be moved horizontally toward and away from each other, while at the same time maintaining all the posts parallel to each other and vertical.

Adjustment of the horizontal spacing between the two sides of the frame is provided in order to accommodate cartons of different widths, and is secured by a lever 72. Lever 72 is pivotally connected at its outer end to the lefthand pair of posts, and terminates at its free end in handle 72a. Thus, when the handle 72a is moved upwardly in FIG. 12, the righthand pair of posts is moved away from the lefthand or fixed pair and the size of the carton-supporting means in one direction (plane of the drawing) is increased. Moving the handle downwardly draws the pairs of posts together, and accommodates a carton smaller in that horizontal dimension. The handle can be maintained in one of several selected adjusted positions corresponding to carton widths by a latch mechanism comprising a plunger 73 slidably mounted on lever 72 and spring-urged at one end into one of several slots along the arcuate edge of fixed plate 75. As may be best seen in FIG. 14, plunger 73 is connected to an operating lever 76 pivotally mounted at 77 to handle 72a which enables the operator upon grasping the handle and lever 76 to release the latch by retracting the plunger from the slot in plate 75.

The carton-holding frame 65 is supported at its upper end from swinging arm 78. Arm 78 in turn is pivotally mounted on stationary post 80 by hinge 81 and a suitable bearing means enabling the arm to swing about a vertical axis established by hinge 81. Post 80 is the stationary upright member of the frame structure F which also supports other elements of the boxing apparatus.

The carton-holding means 12 is thus mounted to swing through a horizontal arc between a starting forward position (12a, FIG. 2a) at which the carton C is placed on the holding means and a rear position at station #2 (12b, FIG. 2a) where the hanger bar is picked up and supported in position directly below a carton. However, as the carton-supporting means moves through this horizontal arc, it is desired that the frame supporting the carton be maintained constantly in a given orientation with respect to the rest of the apparatus, as for example the axis of the trolley, and that the frame not be permitted to rotate about a vertical axis as arm 78 turns about axis 81. For this purpose, there is provided a parallelogram mechanism illustrated particularly in FIG. 15 adapted to maintain a given orientation of the carton-holding frame 65 as illustrated more particularly in FIGS. 16, 17 and 18.

Frame 65 is pivotally mounted on the outer end of arm 78 by shaft 82 which enables the carton-holding frame to turn about a vertical axis with respect to arm 78. Shaft 82 is attached to the lefthand pair of parts 66 by a pair of brackets 82a, thereby keeping one side of the carton-holding frame fixed and causing all width-adjusting movement of lever 72 to occur as movement of the righthand pair of posts 66 takes place. At one upper corner, frame 65 is provided with a rigid arm 83 to which is pivotally connected one end of rod 84, the other end of rod 84 being pivotally connected to stationary bracket 85 mounted on top of post 80 and also providing part of the means for pivotally connecting arm 78 to the post. Rod 84 is parallel to arm 78 and the pivotal connections at the two ends of the rod are located on axes which are perpendicular to the axis of arm 78 and which respectively pass through the axes at 81 and 82.

After arm 78 swings away from the operator, i.e., clockwise from the position of FIG. 15 or 12c in FIG.2a to the transfer position at which it picks up a loaded hanger bar, the parts are in the relative positions indicated in FIG. 16 or at 12b in FIG.2a. When the arm and the carton-holding means swing toward the operator from the position of FIG. 15, the parts move into the positions illustrated in FIG. 18 and at 12a in FIG. 2a.

In the intermediate or carton-loading position of FIG. 15 (12c in FIG. 2a), the carton support frame 65 is positioned over carton receiver 14; and it is desired to provide indexing means which automatically stop and yieldingly hold arm 78 in position with frame 65 directly over the carton receiver, for reasons which will become apparent. Such indexing means is illustrated in FIGS. 15–20. The indexing means include a plate cam 90 rigidly attached to arm 78 and having an arcuate edge surface 90a which is concentric about the axis of shaft 82. Cooperating with this arcuate surface is a cam follower taking the form of roller 91 on the outer end of arm 92, arm 92 being pivotally connected to plate cam 90 by pin 93. Arm 92 is continually biased in a direction to bring roller 91 into engagement with arcuate surface 90a by spring 95 connected at one end to projection 96 which extends away from one side of arm 92, the spring being connected at its other end to a fixed point on frame 65. Cam surface 90a has an indentation 90b, and spring 95 pulls follower 91 into this indentation under certain conditions.

To make the operation of the device easier as arm 78 swings from one end of its travel to the other, it is preferred that roller 91 enter the indentation at 90b only on the forward stroke when indexing action is desired. In order to keep the roller out of the indentation at other times, there is mounted on the top surface of plate cam 90 a second arcuate cam 97 which is pivotally mounted at 99 at one end on plate 90 and which at the other end has a downwardly extending pin 97a passing into an arcuate slot 98 in plate 90, the pin in the slot limiting the range of swinging motion of cam 97 about its pivotal connection 99 with the plate 90. Spring 102 on the underside of cam 90 (FIG. 19) yieldingly urges pin 97a to the rear end of the slot and cam 97 assumes normally the position of FIG. 20. Cooperating with cam 97 is a second cam follower comprising roller 100 on arm 101 which is pivotally connected to plate 90 by pin 93. Roller follower 100 is normally pulled into contact with the convex outer face of cam 97 by tension spring 103 which is connected between the end of arm 101 and the end of arm 96.

The operation of this indexing means will be more readily apparent from reference to FIGS. 15–20. Assuming that the near side of the boxing apparatus as seen in FIG. 1 is the front or forward side when the operator is located, a cycle of operation may be considered as starting when arm 78 is moved forwardly toward the operator to the position of FIG. 18 to bring the carton-holding means in front of receiver 14 where the carton C can be moved upwardly around and over the corner posts 66. The arm is then moved rearwardly away from the operator to station #2 shown in FIG. 16 at which a loaded hanger bar is picked up, as will be explained further. During this portion of the cycle, the arm indexing means is preferably inoperative. After the loaded hanger bar is picked up and transferred to the carton support means, the arm swings toward the operator to bring the carton-holding means to station #3 over the carton receiver 14 and at that time the indexing mechanism becomes operative, bringing roller 91 into indentation 90b as shown in FIG. 15.

Figure 17:
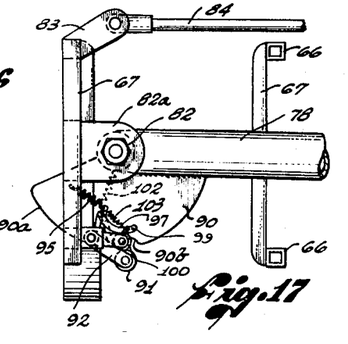
Figure 18:
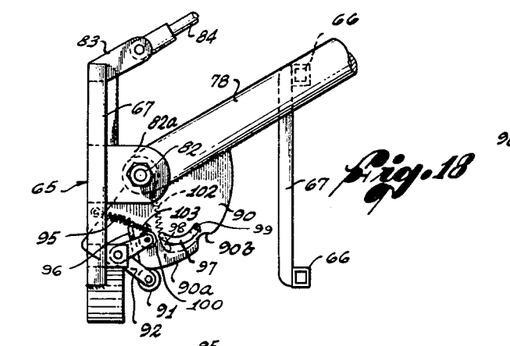
Figure 19:
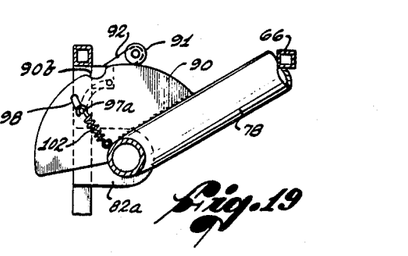
FIG. 19 is a bottom plan view of the parts illustrated in FIG. 16.

With the elements of the indexing means in the position shown in FIG. 18 at the beginning of this full cycle of operation, it will be apparent that as arm 78 swings toward the rear of the apparatus and away from the operator, cam follower 100 rides over the forward convex side of cam 97. The pull of spring 102 moves pin 97a on cam 97 to the rear end of slot 98; and at the same time, contact of roller 100 with the upper cam 97 is maintained by tension in spring 103. Movement of follower 100 along the front surface of cam 97 increases the tension in spring 103 and the pull of spring 95 on follower arm 92 is, in effect, neutralized since both springs 95 and 103 are connected to side arm 96. As a consequence of the increased pull of spring 103, follower 91a on arm 92 is swung away from cam surface 90a. As a result, roller 91 passes over indentation 90b without entering it, as shown in FIG. 17. When arm 78 reaches the end of its backstroke, the parts reach the position of FIG. 16 in which follower 100 has passed entirely off and is clear of cam 97. The combined action of springs 95 and 103 now brings follower 91 against the arcuate surface 90a and swings arm 101 to a position in which follower 100 passes cam 97 at the rear or concave side of cam 97, the cam moving between rollers 91 and 100 on the forward stroke of arm 78 from FIG. 1b to FIG. 15.

As a consequence, as arm 78 now moves toward the front of the apparatus, follower 91 rolls over cam surface 90a and is free to drop into notch 90b under the influence of spring 95. This entry of the roller into the indentation indexes the arm 78 to a position such that frame 65 holding carton C is now directly over carton receiver 14. After the carton is removed from the holding means 12, the cycle of operations is continued by returning arm 78 all the way toward the front past station #3 to the position at which a carton is placed on frame 65. This arm movement causes follower 100 to continue on past cam 97. Follower 100 may engage the concave side of the cam, but it will be seen that the pivotal movement of the cam about pin 99 permitted by slot 98 is sufficient that the cam follower can push cam 97 aside against spring 102 and pass off the end of cam 97, to position the parts as shown in FIG. 18. It will be appreciated that the action of the roller entering indentation 90b is not to lock the swinging arm firmly in a given position, but merely to indicate that it has reached a given position and to hold it yieldingly against accidental displacement from that position. The shape of the indentation and the action of roller 91 are such that the follower can be disengaged from the indentation when desired.

Means are provided for engaging and supporting a loaded hanger bar beneath the open carton supported on the corner posts 66 of the carton-holding means. In order to properly align the loaded hanger bar with respect to the open lower end of such a carton, it is convenient and preferred that the hanger bar be supported directly upon the carton-holding means. For this purpose, there is provided the hanger support arrangement which is shown particularly in FIGS. 11 and 12.

The means for engaging and supporting a loaded hanger bar comprises a pair of similar depending legs 108. One of the legs 108 is rigidly connected to each of the two pairs of corner posts 66 so that the horizontal spacing between the pairs of corner posts in the plane of FIG. 12 changes at the same rate as the spacing between the means for supporting the hanger bars.

At the bottom of each leg 108 is a pair of spring-biased tongs 110, as seen best in FIG. 11. Each of the tongs is pivotally connected at its upper end to a horizontally extending bracket 111 on the lower end of leg 108. A spring 112 connected at its ends to the two tongs 110 draws their lower hook ends together.

Also mounted on bracket 111 is a manually operable push button 114 which has a pair of oppositely inclined surfaces engaging similarly inclined surfaces on the two tongs 110. By depressing push button 114, the two tongs are rotated equally in opposite directions outwardly around their pivotal connections and against the bias of spring 112 to spread the lower ends of the tongs to release a hanger bar as will be further explained.

It will be noticed in FIG. 11 that each of the tongs has an inclined surface 110a adjacent the hook 110b at the end of the tong. When this surface is brought into contact with an outwardly projecting flange 29c on a loaded hanger bar 16 by downward movement of the tongs relative to the hanger bar, the tongs are automatically spread apart by engagement with the hanger bar until the hooks 110b are beneath the flanges 29c on the hanger bar. Then, the bias of spring 112 causes the hook ends of the tongs to be drawn together underneath the two oppositely extending flanges 29c, whereby subsequent upward movement of the tongs lifts the hanger bar clear of trolley carriage 24.

Figures 20, 21, 22:
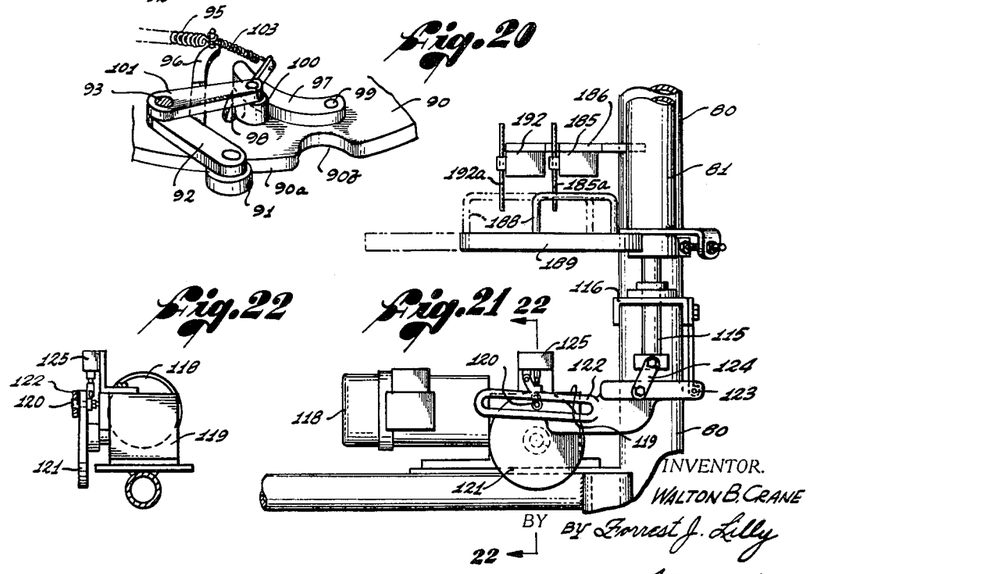
FIG. 20 is an enlarged fragmentary perspective of the indexing means for the carton-holding means.
FIG. 21 is a fragmentary side elevation viewed in the direction of arrow 21 in FIG. 1.
FIG. 22 is a vertical section on line 22—22 of FIG. 21.

Means are provided for raising and lowering tongs 110, together with the entire carton-holding means when at station #2, in order to pick up a loaded hanger bar from the trolley, as described, such means being illustrated particularly in FIGS. 1 and 21. Hinge 81 turns on reduced diameter end portions 115 which are not only journalled for rotational movement but also mounted for sliding axial movement in suitable fixed bearings on stationary frame post 80. As mentioned before, the upper extension 115 is journalled in bracket 85. The lower extension 115 is journalled in bracket 116 which projects laterally from post 80. In FIGS. 11 and 12, post 81 is shown in the raised position.

In order to raise and lower the post and with it the carton-holding means, there is provided a gear head motor 118 which, through a suitable speed reduction gearing at 119 (FIG. 22), drives crank pin 120 mounted in any suitable manner, as by plate 121 on the output shaft of the motor. Crank pin 120 engages a slotted arm 122 which is pivoted at 123 to stationary bracket 116 whereby arm 122 oscillates in a vertical arc about 123 as the crank pin moves in a circular path when motor 118 is energized.

Power supplied to motor 118 is shut off by microswitch 125 which is so arranged that motor 118 is deenergized after pin 120 makes one complete revolution. This is accomplished by locating microswitch 125 at such a position that as arm 122 moves upwardly to its uppermost position, it engages the operating arm of microswitch 125 and causes the power supply circuit to motor 118 to be opened. Accordingly, when motor 118 is energized, crank pin 120 makes a single revolution, lowering the post 81 and the carton-carrying means supported thereby to bring the tongs 110 into engagement with flanges 29 on a hanger bar and to lift the hanger bar off the carriage as the post and the carton-holding means are moved upwardly during the second half of oscillation of arm 122.

CARTON RECEIVER

Carton receiver 14, illustrated in FIGS. 1 and 23–25, is located at a lower level than the carton-holding means in order that the latter can be moved into loading position above the carton receiver.

The carton receiver, like carton-holding means 12, comprises four corner guides or posts; but these are preferably angular members which slidably receive the carton by engagement with external surfaces of the carton where as the upright posts 66 slidably engage internal surfaces of the carton. The carton receiver 14 is mounted upon the platform base of the stationary frame structure indicated generally at F, although any other manner of positioning the carton receiver with respect to the carton-holding means is satisfactory. In some respects, the carton receiver is constructed similarly to the carton-holding means since both are adjustable in size in one dimension to accept cartons of different widths, the various carton widths being necessitated by the different lengths of hanger bars.

Figures 23, 24, 25:
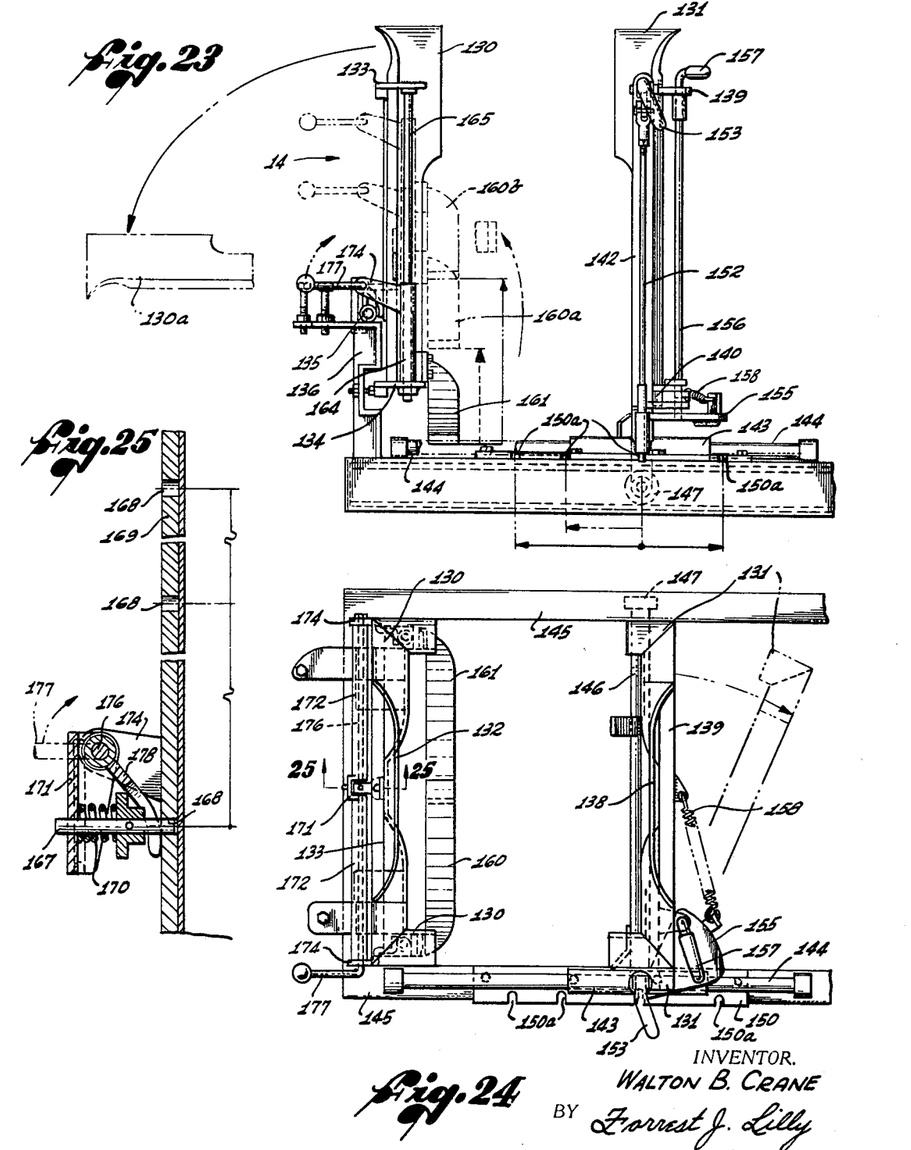
FIG. 23 is an enlarged partial side elevation of the apparatus illustrating the carton receiver.
FIG. 24 is a plan view of the carton receiver of FIG. 23.
FIG. 25 is a fragmentary vertical section on line 25—25 of FIG. 24.

Referring particularly to FIGS. 23 and 24, it will be seen that the carton receiver comprises a first pair of corner guides 130 and a second pair of corner guides 131. The guides of each pair are interconnected by horizontal members so that the spacing between remains constant. As mentioned, the corner guides are preferably angular in configuration to receive the corners of a carton. The two guides 130 are interconnected in any suitable manner, as by plate 132 and horizontally extending bar 133 near the top of the corner guides. A similar cross bar or brace 134 is located near the bottom of the carton receiver.

The structure so far described is pivotally mounted at 135 on upright 136. Pivot 135 establishes an horizontal axis whereby the pair of corner guides 130 and their interconnecting members can be rotated approximately 90° counterclockwise from the upright full line position of FIG. 23 to the horizontal broken line position at 130a. As will be further explained, this tilting movement of one side of the carton receiver permits the loaded carton to be removed from the receiver.

The other pair of corner guides 131 are likewise interconnected by suitable means, such as plate 138 and upper and lower cross braces 139 and 140, respectively. These two guides 131 are mounted on the frame base for two different types of motions. One is horizontal translational motion toward and away from guides 130 in order to adjust the lateral spacing to accommodate cartons of different sizes. For this purpose, the two corner guides 131 are mounted as a unit on column 142 at the base of which is sleeve 143 slidably engaging horizontal rod 144 which in turn is mounted upon a rectangular frame 145. As shown particularly in FIG. 24, frame 145 comprises a pair of horizontally extending parallel channel members, and extending transversely between them is axle 146 which is connected at one end to sleeve 143 and at the other end has a guide roller 147 which rolls within and is guided by the channel of frame 145 at the side of the frame opposite sleeve 143 and guide rod 144. This structure allows the righthand half of the carton receiver to move horizontally as a unit to receive cartons of different sizes.

In order to lock the movable side of the carton receiver in any one of several selected adjusted positions, latch plate 150 is provided mounted on frame channel 145, the latch plate being provided with a plurality of notches 150a at suitable locations. Alongside column 142 is mounted plunger 152 which can be raised and lowered manually by means of handle 153 pivotally mounted at the upper end of the column, the lower end of the plunger being positioned to engage a selected notch 150a in latch plate 150. The locations of notches 150a are selected to correspond with the desired widths of cartons.

The corner guides 130 remain fixed in position, except for their tilting movement as they are retained in a given orientation relative to the lefthand pair of posts 66. Hence both the carton-holding means and the receiver have fixed points of reference with each other and with the leading end of a hanger bar advanced to the predetermined rest position of FIG. 5. The reasons for this relationship will be apparent from the description hereinafter of the loading sequence of operations.

The two corner guides 131 are mounted for a second movement, which is a swinging movement, about a vertical axis established by column 142. This allows the righthand side of the carton receiver to swing in a clockwise direction from a full line position of FIG. 24, in which it is parallel to the other side of the carton receiver, to the broken line position in order to release a carton from the receiver.

The movable side of the carton receiver can be held in the parallel position by any suitable means. As exemplary of such means, there is shown a latch plate 155 rigidly attached to column 142 and having a hole therein to receive the end of plunger 156. The plunger may be disengaged from the plate by lifting the rod upwardly by means of handle 157. The gate is then swung to the open position by a force applied through coil spring 158 which is attached at one end to stationary latch plate 155 and at the other end to the lower cross brace 140.

The fiberboard cartons with which the present device is used commonly are shipped in a flattened condition and are stacked adjoining the garment boxing apparatus in this condition. Consequently, they must be erected before loading and finally closed after the garments are in place. Because of this typical situation, the cartons when placed on the carton-holding means are open at both ends, that is they resemble rectangular tubes. The foldable end flaps which are folded over one another to close the ends after the carton is erected, are open and extend in prolongation of the sidewalls of the carton when the cartons are placed on the holding means 12, as may be seen in FIGS. 12 and 13.

Also, it should be noted that the ordinary condition under which the boxing apparatus is used is that it is required to adapt itself to cartons which vary in two dimensions, having one dimension constant. For this reason, the spacing between two corner guides, for example guides 130 can remain constant, whereas the horizontal dimension at right angles thereto can vary as may be required to accommodate a carton to a larger or smaller number of garments. Provision for this has been described in the means that permits the guides 131 to move horizontally. Garments also differ in lengths, as for example blouses and sweaters as compared with dresses, so that it is desirable to provide accommodation in the apparatus for boxes or cartons of different vertical dimensions.

Keeping these conditions in mind, it will be appreciated that it is preferable to provide on the carton receiver means for tucking the bottom end flaps to initiate their folding and also to accommodate the carton receiver to cartons of different heights while limiting downward travel of the carton to position the top edge thereof. These varying conditions are met by providing a pair of curved tucking elements 160 and 161, which are mounted upon cross braces 134 and which may conveniently be joined at their inner ends in order to give greater rigidity. As may be seen in FIG. 1, the tucking element 160 is higher than the element 161 in order to overlap the flaps as they are tucked under by these respective elements.

Acting also as means to limit downward travel of the cartons in the receiver, the tucking elements are mounted on sleeves 164 slidable vertically on rods 165 which are mounted at their upper and lower ends on cross braces 133 and 134, respectively. Tuckers 160 and 161 can be raised and lowered along rods 165. They are shown in the lowermost position in solid lines in FIG. 23 but can be raised to adjusted positions 160a or 160b as desired. The tuckers fold inwardly two opposite end flaps, and by engagement with the sidewalls of a carton limit its downward movement. The reason for that is to bring the upper end of each carton to a predetermined level; and to accomplish this for various heights of cartons, the tuckers are raised or lowered as needed.

In order to lock the tuckers in any one of the various selected heights, there is provided latch mechanism which may be of any suitable type but is exemplified by the latch mechanism shown in FIGS. 24 and 25. This latch mechanism comprises a spring-loaded plunger 167 designed to enter a selected hole to lock tuckers 160 and 161 at any desired height.

The plunger is mounted upon bracket 171 which in turn is attached to a pair of axially aligned sleeves 172 which extend inwardly toward each other from arms 174 projecting laterally from the two sleeves 164. Sleeves 171 and 172 journal operating rod 176 which is bent at one end to provide a handle 177. Midway of its length at bracket 171, arm 178 is attached to operating rod 176 whereby rotation of the rod by handle 177 moves plunger 167 out of a hole 168, allowing the tuckers to be moved up or down, after which the plunger can be re-engaged in another hole at the desired height.

CONTROL CIRCUIT

Many of the movements of the apparatus can be effected manually, except that the weight of the parts involved in raising and lowering arm 78 carrying the carton-holding means requires the application of power from some mechanical or electrical source. Even with the provision of electrical motors to power the movements of the machine, it will be realized that various movements can be initiated by manually operated push button controls in a simplified version of the apparatus.

As the demands on a given piece of apparatus increase and greater efficiency is required, it becomes more satisfactory to provide some degree of automation or mechanical control of the movements in order to synchronize motions of the various parts of the machine. For this purpose, the preferred embodiment of the invention includes a combination of switches or controls which are both mechanically and manually operated, as may be seen by reference to circuit diagram of FIG. 26.

Figure 26:
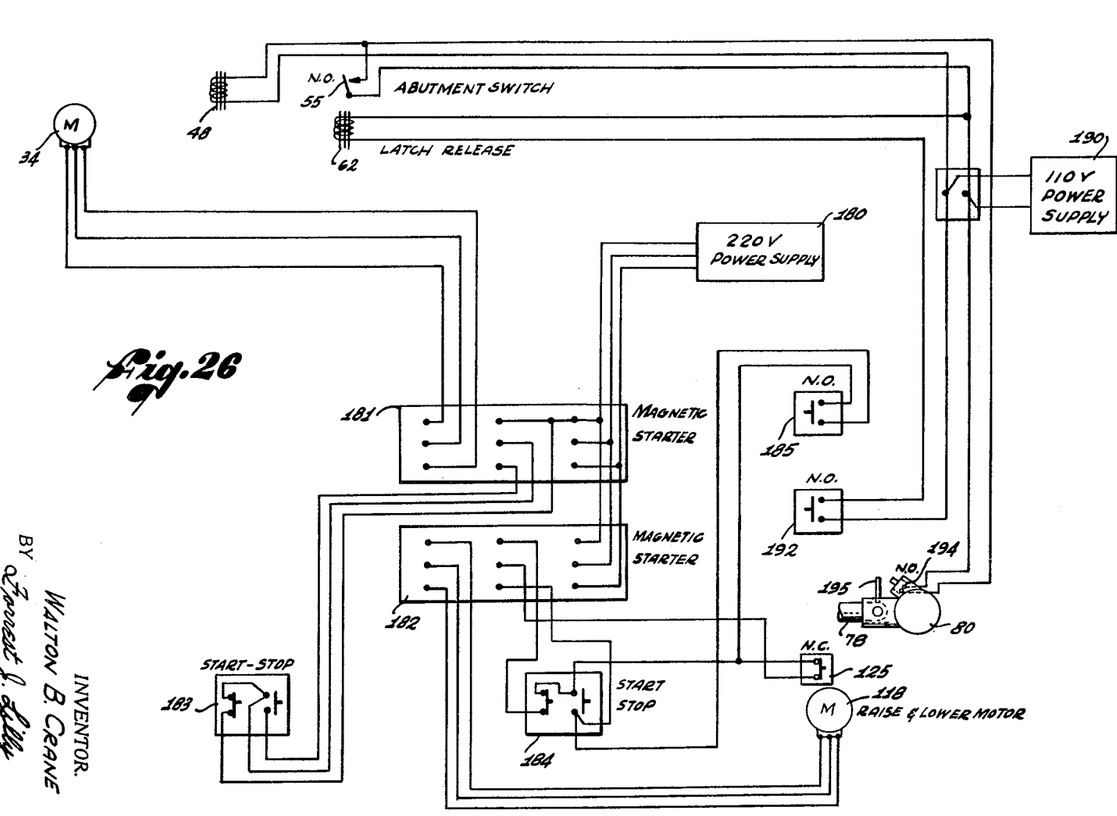
FIG. 26 is a circuit diagram of the electrical control circuit.

Referring now to the circuit diagram, it will be seen that motor 34, which drives the trolley chain, and motor 118, which raises and lowers arm 78, are both connected to some suitable power supply, preferably 220 volt, 3-phase power, as indicated at 180. As is customary with motors of this type, the control circuit for each motor includes a magnetic starter, the starters at 181 and 182 being respectively for the trolley chain motor 34 and raise-and-lower motor 118. Manual starting and stopping of the motors is controlled respectively by start-stop switches 183 and 184 connected to the respective magnetic starters.

It will be noticed that normally closed switch 125 is wired in series with the power supply to the raise-and-lower motor, switch 125 being placed in one conductor between start-stop switch 184 and the magnetic starter 182. It will be recalled that switch 125 is designed to limit each period of energization of motor 118 to a time sufficient to accomplish a complete cycle of up and down movement of arm 78.

In order to start motor 118 at a predetermined point in the cycle of operations, there is provided switch 185 which is wired in parallel across the normally open contacts of the start side of switch 184. Thus, switch 185, which is normally open, can, when closed, cause starter 182 to energize motor 118.

Switch 185 is mounted on a laterally projecting arm 186 which in turn is mounted on stationary frame post 80, as shown particularly in FIG. 21. The depending switch operating arm is engaged by a U-shaped rod 188 which rises above laterally extending arm 189 carried by and projecting from one side of hinge 81.

Operating arm 185a of the switch is a long flexible blade. As arm 78 and the parts carried thereby are swung manually to the pick-up or transfer position, designated as station #2, loop 188 engages the front side of arm 185a and deflects it rearwardly slightly before switch 185 is closed.

Closing switch 185 causes motor 118 to become energized for a period, thereby lowering and subsequently raising arm 78 and hinge 81. This movement of the hinge causes arm 189 to lower and raise; and when the arm finishes the upward stroke, loop 188 has now risen in behind flexible switch arm 185a which springs forward as loop 188 passes it moving down. The arm yields during the subsequent forward movement of arm 78 that brings the carton to the loading position, thereby allowing loop 188 to again pass the arm and move to the front of it; and on this forward movement, the switch arm does not cause switch 185 to close.

Again referring to FIG. 26, it is preferable that the control solenoids be lower voltage units than the motors and consequently, they are shown as being provided with power derived from a 110-volt, single phase power supply as indicated at 190. Power is supplied from this source to solenoid 48 which deactivates the trolley chain dogs and to solenoid 62 which unlatches abutment plate 56. Plate 56 when raised closes normally open switch 55 which energizes solenoid 48.

Solenoid 62 is preferably energized only after a loaded hanger bar has been picked up from the trolley carriage and transferred to the carton holding means. Since this timing can be effected by energizing solenoid 62 in timed relation to the swinging movement of arm 78, switch 192 in series with solenoid 62 is also located on arm 186 as shown in FIG. 21. Similar to the arrangement already described, switch 192 has a depending, resilient operating arm 192a which is engaged by wire loop 188 as the movement of hinge 81 swings the loop forwards and backwards. However, switch 192 and its operating arm 192a are so arranged that switch 192, which is normally open, is closed only by forward movement of loop 188. Thus, the switch is closed only after a loaded hanger bar has been removed from the trolley and the apparatus is in condition for movement of another loaded hanger bar into the predetermined position where it can be picked up by the carton-holding means.

An optional safety switch is also shown in FIGS. 15 and 26. Switch 194 is a normally open switch wired in parallel with abutment switch 55 to energize solenoid 48 when closed. Switch 194 is mounted on post 80 at a position to be engaged and closed by vertically extending rib 195 on hinge 81 as the arm and carton-holding means approach the pick-up or transfer position 12b of FIG. 2a. During the down and up cycle of travel of the arm and carton-holding means 12, the switch is held closed and is returned to the open condition only after the arm leaves the transfer station and is moving toward loading position 12c (FIG. 2a). Keeping the switch closed energizes solenoid 48 during a period when the driving dogs 36 should be inoperative to avoid possible jamming of the trolley mechanism by the tongs in the absence of a hanger bar on a carriage in position to close switch 55.

SUMMARY OF OPERATION

Having described the construction of the garment boxing apparatus and the operation of some of the parts thereof, the operation of the entire apparatus will now be summarized.

Referring particularly to FIGS. 2 and 2a which show the several operations and the locations at which they are carried out in diagrammatic form, it will be understood that a hanger bar of a length suitable to the number of garments, is first loaded with a number of garments which are normally suspended from the hanger bar, all of the garments constituting a single shipment. Although the hanger bar may be moved from place to place in order to make up the shipment, the loading is assumed for purpose of description to take place at an area designated as station #1, which may be a warehouse or stockroom and which may be removed a greater or lesser distance from the location of the garment boxing apparatus.

The loaded hanger bar is brought by the trolley system 10 to a predetermined location designated as station #2. As the loaded hanger bar approaches station #2, it comes within the range of action of the driving dogs 36 which engage a trolley carriage and advance it. When the loaded hanger bar reaches station #2, it comes in contact with abutment plate 52 (see a in FIG. 2) and moves the abutment plate from the lowered or tilted position of FIG. 4 to the raised position of FIG. 5. In the latter position, the abutment plate actuates microswitch 55 which deactivates the driving dogs and brings the carriage to a stop at a desired predetermined position.

In practice, hanger bars are of several lengths to each accommodate a different number of garments, since the number of garments in each group is variable, not fixed. For economy, cartons are different in width dimension to correspond to the different lengths of hanger bars. Since successive hanger bars brought to the transfer position at station #2 may be of different lengths, it is preferred to color code the bars so that the operator may quickly and accurately recognize the length of the next bar to be picked up and may select the proper carton for that particular hanger bar. As will be more fully explained, the reason for this is that each hanger bar spans the distance between two sidewalls and the bar end supports rest on the sidewalls of the carton.

In preparation for loading, a carton of selected width is taken from a stack, not shown, of flattened cartons located near the boxing apparatus. The holding means 12 has been adjusted manually by manipulation of lever 72 to the size of the selected carton. The carton is opened into a rectangular tubular configuration in which the flaps closing the bottom end of the carton are in prolongation of sidewalls of the carton. This tubular carton is manually drawn upwardly around the carton-holding means 12, which is located on the outer end of arm 78, to assume the position d in FIG. 2. To engage the carton on the carton-holding means, arm 78 is swung to the forward position shown in FIG. 2a bringing the carton-holding means into the position 12a where it is forward of and clear of the carton receiver 14.

Although the carton may be held by friction on the posts 66, it is advantageous to provide on two opposite sides of holder 12 gravity biased indexing hooks 194 which, as shown in FIG. 12, engage the lower edge of the tubular carton at the open flaps to support it in position on carton-holding means 12. These hooks also serve to keep the end flaps spread apart so that they do not interfere with the subsequent placement of the carton around the garments. The carton C is now in the position d shown in FIG. 12 with its axis oriented generally vertically and the open ends in generally horizontal planes.

Arm 78 and the parts mounted thereon, particularly the carton-holding means are now swung rearwardly to locate the carton-holding means directly over the loaded hanger bar at station #2. This is the pick-up or transfer position of the carton-holding means and it is now vertically aligned or registered with the hanger bar on the trolley. Tongs 110 on the carton-holding means are directly over the hanger bar to effect transfer of the loaded hanger bar to the carton-holding means, as shown at b in FIG. 2. Registration is insured since the leading end of each hanger bar, regardless of length, reaches a predetermined position when brought to rest on the trolley. The fixed side of the carton-holding means is positioned with reference to that leading end to obtain proper registration. Adjustment of the holding means to carton size also effects proper spacing of the two sets of tongs 110 to the length of the hanger bar to be picked up.

As the carton-holding means reaches the proper position over the hanger bar, switch 185 is closed, thereby energizing the raise-lower motor 118 which causes the carton-holding means to be lowered to bring tongs 110 into engagement with flanges 29c on the hanger bar. As the carton-holding means descends, switch 185 is released but motor 118 continues to be energized by virtue of operation of the magnetic starter 182.

After tongs 110 have engaged the loaded hanger bar, the carton-holding means and arm 78 move upwardly, the cycle of motion being completed when slotted arm 122 engages switch 125 and opens the circuit to motor 118. The hanger bar is now supported as at c in FIG. 2 on the carton-holding means directly below the open lower end of the carton.

The carton and the loaded hanger bar are now both transferred, moving simultaneously, to loading station #3 directly above carton receiver 14. At station #3, the hooks 194 are disengaged from the lower edge of the carton, and the carton is manually pulled down around the garments suspended from the hanger bar. As the carton moves down, two end flaps at the bottom of the carton are moved into a folded position in which they overlap one another by engagement with tuckers 160 and 161. The carton thus appears as at e in FIG. 2.

Downward movement of the carton is continued until the upper edge of the carton sidewalls passes outer short flanges 29a on the end supports of the hanger bar but has not passed inner long flanges 29b. The top edge of the carton is a the level shown by the broken line in FIG. 11a. The natural elasticity of the carton allows the two opposite sidewalls to spring outwardly a sufficient distance that they pass around the major length of the hanger bar and after these walls pass the shorter flanges 29a on the ends of the hanger bar, the carton walls spring inwardly so that they are between the flanges 29a and 29b.

In this position, the two release buttons 114 are pressed, spreading the two pairs of tongs 110 to disengage them from the hanger bar, and the hanger bar is allowed to drop by gravity onto the sidewalls of the carton. It is then seated firmly on the sidewalls of the carton by manually pressing down on the ends of the hanger bar so that the sidewalls are received in between the two flanges 29a and 29b at each of the opposite ends of the hanger bar, all as is more fully described in my co-pending application referred to above. As may be seen clearly in FIGS. 2 and 12, flaps at two opposite sides of the upper end of the carton are folded back 180° so that the hanger bar engages a double thickness of the carton walls at these points.

The carton has now been loaded, and the hanger bar with its suspended garments is supported from the sidewalls of the carton. The carton is supported in the receiver so that the final operation of closing the carton can now take place. This is accomplished by folding the four flaps at the top end of the carton into overlapping relationship and holding them in closed position, either by an adhesive or by applying sealing tape, as indicated at g in FIG. 2. With the upper end of the carton closed, it is now ready for removal from the carton receiver. This is accomplished by first lifting handle 157 so that the right hand side of the receiver can be swung away from the carton to the broken line position of FIG. 24. Next, the left hand side of the carton receiver is tilted manually about pivot 135 to bring the side of the receiver to the horizontal position indicated in broken lines at 130a in FIG. 23. The carton is now tilted on its side since it moves with the sidewall of the receiver, exposing the bottom of the carton for final closing operations. These involve folding over the two remaining bottom flaps, shown extended at g in FIG. 2 so that they are overlapping and overlying the other two bottom flaps and then applying sealing tape, adhesive, or other means for holding all the closed flaps in position.

By tilting the side of the receiver, the carton is placed on conveyor 15 and the loaded carton can now be moved by the conveyor to any other desired point for further handling, such as storage, shipping, or the like.

From the foregoing description, it will be apparent that various changes in the detailed construction and arrangement of the garment boxing apparatus may occur to persons skilled in the art without departing from the spirit and scope of the present invention. Accordingly, the foregoing description is considered to be illustrative of, rather than limitative upon, the invention as defined by the appended claims.

I claim:
1. Garment boxing apparatus for loading into a carton a group of garments hanging from a rigid hanger bar, comprising:
  carton holding means supporting a carton having foldable end flaps open at opposite ends of the carton;
  support means to engage and support a loaded hanger bar beneath the carton in position to permit the carton to be drawn downwardly around the hanger bar and garments thereon;
  means limiting downward travel of the carton to locate the top of the carton at a predetermined position relative to the hanger bar;
  and means for releasing the loaded hanger bar from the support means therefor.

2. Garment boxing apparatus according to claim 1 which also includes means adjusting the carton holding means to cartons of different sizes.

3. Garment boxing apparatus according to claim 1 which also includes:
  a carton receiver below the carton holding means, said receiver including means engaging the sides of the carton to hold the carton and also including said means limiting the downward travel of the carton.

4. Garment boxing apparatus according to claim 3 which also comprises:
  an arm mounted to swing about a vertical axis and carrying the carton holding means for swinging movement over and to opposite sides of the carton receiver.

5. Garment boxing machine according to claim 4 that also includes means indexing the arm and holding means to a position over the receiver.

6. Garment boxing apparatus according to claim 3 in which the receiver has a pair of cams tucking in bottom end flaps on opposite sides of the carton as it approaches the limit of downward travel.

7. Garment boxing apparatus according to claim 3 in which the receiver comprises four angular corner guides slidably receiving the carton.

8. Garment boxing apparatus according to claim 7 in which two guides at one side of the carton are movable to release the carton in the receiver.

9. Garment boxing apparatus according to claim 7 in which two guides at one side of the carton are pivoted to swing about a horizontal axis to tilt a carton in the receiver.

10. Garment boxing apparatus according to claim 3 in which the carton receiver includes means for adjusting the spacing of elements engaging the sides of the carton to accommodate cartons of different sizes.

11. Garment boxing apparatus according to claim 3 in which the carton holding means slidably engages internal surfaces of the carton and the receiver slidably engages external surfaces of the carton.

12. Garment boxing apparatus according to claim 1 in which the means limiting downward travel of the carton is adjustable to different levels to accommodate cartons of different heights.

13. Garment boxing apparatus according to claim 1 that also comprises:
  trolley means conveying loaded hanger bars to be boxed;
  and means stopping a loaded hanger bar on said trolley means at a predetermined position relative to the carton holding means.

14. Garment boxing apparatus according to claim 13 which also comprises means lowering and subsequently raising the support means to engage a hanger bar at said predetermined position and to lift the hanger bar free of the trolley.

15. Garment boxing apparatus according to claim 14 which includes means mounting the carton holding means for swinging movement about a vertical axis between a first position over the trolley means and a second position over the receiver.

16. Garment boxing apparatus according to claim 14 in which the support means for a hanger bar are mounted on and carried by the carton holding means.

17. Garment boxing apparatus according to claim 11 in which the trolley means comprises:
  a rail;
  a wheeled carriage movable along the rail;
  a drive member carrying a plurality of driving dogs movably mounted thereon and individually engageable with the carriage to move it along the rail, said dogs being movable out of driving position;
  and means normally biasing the dogs into driving position but movable to a non-biasing position, said dogs being inactivated by said means for stopping a loaded hanger bar.

18. Garment boxing apparatus according to claim 1 in which the support means for a hanger bar are mounted on and carried by the carton holding means,
  and which also includes means adjusting the carton holding means and the hanger bar support means simultaneously to different sizes of cartons and hanger bars, respectively.

19. Garment boxing apparatus according to claim 1 in which the garment hanger bar has near each end a pair of outwardly and oppositely extending flanges, and the hanger bar support means includes
  two spaced pairs of spring-biased tongs, of which each pair of tongs is engageable with one pair of flanges to support the hanger bar;

and manually operative means adapted to spread the tongs against the spring bias to disengage the hanger bar.

20. Garment boxing apparatus according to claim 1 in which the garment hanger bar has at each end a pair of horizontally spaced depending flanges of which one flange extends below the other flange;
and in which the means limiting downward travel of the carton positions the top edge of the carton above the lower edge of the longer flange but below the shorter flange.

21. Garment boxing apparatus for loading into a carton a group of garments hanging from a rigid hanger bar, comprising:
carton holding means holding a carton having foldable end flaps open at the upper and lower ends of the carton;
support means carried by said carton holding means for supporting a loaded hanger bar beneath the carton in position to permit the carton to be drawn downwardly around the hanger bar and garments thereon;
trolley means for conveying loaded hanger bars to the vicinity of the carton holding means for boxing;
and means stopping a loaded hanger bar on said trolley means at a predetermined location with respect to the carton holding means.

22. Garment boxing apparatus according to claim 21 that also includes:
means for lowering and subsequently raising the means supporting a hanger bar to engage a hanger bar on the trolley and lift the loaded hanger bar free of the trolley.

23. Garment boxing apparatus according to claim 22 which also comprises manually actuated means for releasing a hanger bar from said bar supporting means.

24. Garment boxing apparatus according to claim 21 in which the trolley means comprises:
a rail;
a wheeled carriage movable along the rail;
a drive member carrying a plurality of driving dogs movably mounted thereon and individually engageable with the carriage to move it along the rail, said dogs being movable out of driving position;
and means normally biasing the dogs into driving position but movable to a non-biasing position, said dogs being inactivated by said means for stopping a loaded hanger bar.

25. Garment boxing apparatus according to claim 24 which also comprises:
a movable abutment in the path of a hanger bar on the carriage and engageable thereby;
and means responsive to movement of the abutment upon engagement by a hanger bar on the carriage to shift the biasing means to a non-biasing position whereby the dogs are movable out of driving position.

26. Garment boxing apparatus according to claim 25 which also includes means restoring the dog biasing means to a normal biasing position when a hanger bar is removed from said engagement with the abutment.

27. Garment boxing apparatus according to claim 21 that also includes means mounting the carton holding means and the support means thereon for horizontal movement between a position over the trolley means and a loading position at one side of the trolley means at which a carton can be moved upwardly onto the holding means.

28. Garment boxing apparatus according to claim 27 in which the support means comprises:
two spaced pairs of tongs engageable with a hanger bar on the trolley means by downward movement of the support means;
and manually operated means spreading said tongs to release a loaded hanger bar.

29. Apparatus for loading into a carton a group of garments hanging from a rigid hanger bar, comprising:
trolley means for conveying the loaded hanger bar and supported garments to a transfer station;
carton holding means holding a carton having foldable end flaps open at the upper and lower ends of the carton at a loading station;
transfer means for picking up said hanger bar from said trolley means and transferring it to said loading station at a location beneath said carton holding means so as to permit the carton to be drawn downwardly over the hanger bar and garments thereon;
and means on said transfer means selectively operable to cause said transfer means to release the hanger bar.

30. Apparatus according to claim 29 in which said transfer means and carton holding means move together.

31. Apparatus according to claim 29 which includes:
support means pivotally mounting the transfer means for horizontal swinging movement between said loading station and said transfer station.

32. Apparatus according to claim 29 which includes also:
indexing means yieldably holding the transfer means at the loading station.

33. Apparatus according to claim 29 which also includes:
means raising and lowering the transfer means at the transfer station to bring the transfer means into contact with the loaded hanger bar;
and means automatically picking up the hanger bar by the transfer means during said up and down movement.

34. A method of loading into a carton a group of garments hanging from a rigid hanger bar, including the steps of:
conveying the hanger bar to a transfer station;
forming a carton adapted to receive the hanger bar and garments into a tubular shape with the carton ends open and its axis oriented generally vertically, and positioning the carton at a loading station;
picking up the hanger bar at said transfer station and moving the bar to said loading station at a location beneath and in alignment with the open lower end of the carton;
moving said carton down around said hanger bar and garments;
transferring the hanger bar to and seating the hanger bar on the upper end of the sidewalls of said carton;
and closing and sealing the ends of the carton.

35. A method according to claim 34 in which the carton is moved down around the bar and garments until a portion of the hanger bar is above the upper edge of the sidewalls of the carton;
and then moving the hanger bar down to seat and support the hanger bar and garments on the carton.

References Cited
UNITED STATES PATENTS
3,023,558 3/1962 Mitchell _____________ 53—241
3,308,601 3/1967 Masters _____________ 53—256

TRAVIS S. McGEHEE, Primary Examiner

R. L. SPRUILL, Assistant Examiner

U.S. Cl. X.R.

53—37, 256